(12) United States Patent
Zou et al.

(10) Patent No.: US 10,563,722 B2
(45) Date of Patent: Feb. 18, 2020

(54) HYDRAULIC BUSHING

(71) Applicant: Zhuzhou Times New Material Technology Co., Ltd., Hunan (CN)

(72) Inventors: Bo Zou, Hunan (CN); Dan Luo, Hunan (CN); Xingwu Ding, Hunan (CN); Jiling Bu, Hunan (CN); Yaxin Zhang, Hunan (CN); Jianxun Liu, Hunan (CN); Jo Gross, Hunan (CN); Tao Wang, Hunan (CN)

(73) Assignee: ZHUZHOU TIMES NEW MATERIAL TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 15/372,933

(22) Filed: Dec. 8, 2016

(65) Prior Publication Data

US 2018/0156304 A1 Jun. 7, 2018

(30) Foreign Application Priority Data

Dec. 2, 2016 (CN) .......................... 2016 1 1096400

(51) Int. Cl.
*F16F 13/14* (2006.01)
*B61F 5/50* (2006.01)

(52) U.S. Cl.
CPC ............... *F16F 13/14* (2013.01); *B61F 5/50* (2013.01)

(58) Field of Classification Search
CPC ........ F16F 13/18; F16F 13/16; F16F 13/1481; F16F 13/1463; F16F 13/1454;
(Continued)

(56) References Cited

U.S. PATENT DOCUMENTS

| 4,139,246 A | * | 2/1979 | Mikoshiba | ............... B60G 7/02 264/261 |
| 4,667,942 A | | 5/1987 | Bitschkus et al. | |

(Continued)

FOREIGN PATENT DOCUMENTS

| CN | 1571895 A | 1/2005 |
| CN | 1625661 A | 6/2005 |

(Continued)

OTHER PUBLICATIONS

Chinese Office Action dated Apr. 18, 2019 in Chinese Application No. 201611206104.3.

(Continued)

*Primary Examiner* — Bradley T King
*Assistant Examiner* — Stephen M Bowes
(74) *Attorney, Agent, or Firm* — Harness, Dickey & Pierce, P.L.C.

(57) ABSTRACT

The present invention relates to a hydraulic bushing, including a main spring and a cylindrical outer housing. The main spring comprising: a core shaft; a first rubber body arranged on an outer wall of the core shaft, wherein two liquid chambers diametrically opposite to and spaced from each other are formed on the first rubber body, each liquid chamber extending throughout the first rubber body along an axial direction thereof; and a sleeve mounted on an outer wall of the first rubber body, a groove being formed in an outer wall of the sleeve. The main spring is disposed inside an inner chamber of the outer housing, and a flow channel for connecting the two liquid chambers with each other is formed between the outer housing and the sleeve through the groove.

17 Claims, 8 Drawing Sheets

(58) Field of Classification Search
CPC .............. F16F 13/1445; F16F 13/1418; F16F 13/1409; F16F 13/14; F16F 1/387; F16F 1/3828; F16F 1/3821; B60G 2204/41062
USPC .................................................. 267/140.12
See application file for complete search history.

(56) References Cited

U.S. PATENT DOCUMENTS

| | | | |
|---|---|---|---|
| 4,693,456 A | 9/1987 | Kanda | |
| 4,700,934 A * | 10/1987 | Andra | F16F 13/14 267/140.12 |
| 4,840,357 A * | 6/1989 | Jouade | F16F 13/14 267/140.12 |
| 4,883,260 A * | 11/1989 | Kanda | F16F 13/14 267/140.12 |
| 8,087,648 B2 * | 1/2012 | Auten | F16F 13/16 267/140.12 |
| 10,086,645 B2 * | 10/2018 | Liu | B60B 17/0027 |
| 2003/0098534 A1 * | 5/2003 | Graeve | F16F 13/16 267/140.11 |
| 2007/0108677 A1 | 5/2007 | Huettner et al. | |
| 2011/0188790 A1 * | 8/2011 | Eschweiler | F16F 13/14 384/99 |

FOREIGN PATENT DOCUMENTS

| | | |
|---|---|---|
| CN | 1626844 A | 6/2005 |
| CN | 1871457 A | 11/2006 |
| CN | 101509532 A | 8/2009 |
| CN | 102271936 A | 12/2011 |
| CN | 102472354 A | 5/2012 |
| CN | 102478095 A | 5/2012 |
| CN | 102996701 A | 3/2013 |
| CN | 203211041 U | 9/2013 |
| CN | 203358608 U | 12/2013 |
| CN | 104191927 A | 12/2014 |
| CN | 104641143 A | 5/2015 |
| CN | 104736878 A | 6/2015 |
| CN | 104822964 A | 8/2015 |
| CN | 104912995 A | 9/2015 |
| CN | 105308353 A | 2/2016 |
| CN | 206361076 U | 7/2017 |
| CN | 206555348 U | 10/2017 |
| CN | 108150535 A | 6/2018 |
| CN | 108150536 A | 6/2018 |
| CN | 108150585 A | 6/2018 |
| CN | 108150597 A | 6/2018 |
| CN | 108150598 A | 6/2018 |
| JP | H01150035 A | 6/1989 |
| JP | H0510381 A | 1/1993 |

OTHER PUBLICATIONS

Chinese Office Action dated Jan. 3, 2019 in Chinese Application No. 201611205014.2.
Chinese Office Action dated Feb. 28, 2019 in Chinese Application No. 201611206570.1.
Chinese Office Action dated Jan. 30, 2019 in Chinese Application No. 201611206851.7.
Chinese Office Action dated Feb. 28, 2019 in Chinese Application No. 201611205646.9.
Chinese Office Action dated Mar. 12, 2019 in Chinese Application No. 201611166343.0.
Chinese Office Action dated Mar. 12, 2019 in Chinese Application No. 201611166520.5.
Chinese Office Action dated Feb. 28, 2019 in Chinese Application No. 201611168201.8.
Chinese Office Action dated Mar. 12, 2019 in Chinese Application No. 201611166938.6.

* cited by examiner

HYDRAULIC BUSHING

FIELD OF THE INVENTION

The present invention relates to the field of rail vehicles, and in particular, to a hydraulic bushing.

BACKGROUND OF THE INVENTION

Rail vehicles can operate simply in two states, of which, a first one is a straight running state, and a second one is a curve running state. In the prior art, a rubber arm is usually used to connect a wheel to a bogie, such that the vehicle can travel quickly and stably along the rail in the straight running state, and turn smoothly along the rail in the curve running state.

In order to enable the vehicle to operate stably in the straight running state, the rubber arm is usually configured to have a relatively large stiffness. However, such a rubber arm with relatively large stiffness will result in severe abrasion of the wheel and the rail in the curve running state, thereby increasing operation costs of the vehicle.

SUMMARY OF THE INVENTION

In view of some or all of the above problems, the present invention provides a hydraulic bushing. The use of the hydraulic bushing of the present invention on a rail vehicle not only can assure stable operation of the vehicle in a straight running state, but also can reduce abrasion of a wheel and a rail in a curve running state.

A hydraulic bushing according to the present invention includes a main spring and a cylindrical outer housing. The main spring comprising: a core shaft; a first rubber body arranged on an outer wall of the core shaft, wherein two liquid chambers diametrically opposite to and spaced from each other are formed on the first rubber body, each liquid chamber extending throughout the first rubber body along an axial direction thereof; and a sleeve mounted on an outer wall of the first rubber body, a groove being formed in a wall of the sleeve. The main spring is disposed inside an inner chamber of the outer housing, and a flow channel for connecting the two liquid chambers with each other is formed between the outer housing and the sleeve through the groove.

In an embodiment, the groove is arranged helically in the outer wall of the sleeve, and a notch in communication with the groove is provided on an end face of the sleeve.

In an embodiment, the core shaft has a first step surface, so that the core shaft is formed as a stepped shaft with a diameter in its middle segment being larger than that at both end segments thereof, the first rubber body being arranged on the middle segment of the core shaft. And a sealing assembly including a second rubber body and a first matching element is provided at each end of the core shaft, the second rubber body being configured to contact an axial end face of the sleeve and the first step surface, and the first matching element being configured to separate the two liquid chambers from each other at a same end.

In an embodiment, the first matching element is configured as a convex piece, and engaged with a second matching element, which is formed on the first rubber body and configured as a concave piece.

In an embodiment, the first matching element is configured as a convex piece having an arcuate radial cross section, and the arcuate surface of the first matching element extends toward the second matching element. Alternatively, the first matching element is configured as a convex piece having an arcuate radial cross section, and an arcuate surface of the first matching element extends toward the second matching element, an arc-like projecting strip being provided on the arcuate surface of the first matching element.

In an embodiment, an end face of the first rubber body is formed with an annular groove distributed along a circumferential direction thereof, and an auxiliary liquid chamber is formed by the first rubber body, the second rubber body, the sleeve and the first matching element at a region of the annular groove.

In an embodiment, each liquid chamber is configured to extend along the circumferential direction of the first rubber body in a radial cross section, and a radial dimension of each liquid chamber at both circumferential end portions thereof is larger than that at its middle portion.

In an embodiment, the sealing assembly includes a rigid supporting ring member, which includes a mounting ring arranged on the core shaft and a projecting ring extending outwardly along a radial direction from an outer wall of the mounting ring. The second rubber body is arranged on an outside of the mounting ring, and wrapped around the projecting ring.

In an embodiment, the second rubber body is provided with at least one rubber peak engaged with the outer housing through interference fit.

In an embodiment, along a direction from axially inner to axially outer, the second rubber body is provided with a first rubber peak, a second rubber peak and a third rubber peak. Both of the first rubber peak and the third rubber peak engage with the outer housing through interference fit, and the second rubber peak faces toward the projecting ring. A first backing ring, which is rigid and coaxial with the mounting ring, is buried in the first rubber peak and located near the sleeve. The first backing ring faces toward the end face of the sleeve.

In an embodiment, a first protrusion bulging outwardly along a radial direction is provided on the first rubber peak at a position corresponding to the first backing ring.

In an embodiment, the sleeve includes a cylindrical housing body and a radially-extending portion connected thereto, the radially-extending portion being formed by press fit for contacting the sealing assembly.

In an embodiment, a second step surface is provided on the housing body, so that an inner diameter of the housing body at each end part thereof is larger than that of the housing body in its middle part. A second backing ring, which is rigid and coaxial with the mounting ring, is buried in the third rubber peak, and extends, along with the third rubber peak located radially outside of the second backing ring, into a space formed by the second step surface and the radially-extending portion.

In an embodiment, a second protrusion bulging outwardly along the radial direction is provided on the third rubber peak at a position corresponding to the second backing ring.

In an embodiment, an axially outer end face of the second backing ring directly contacts with the radially-extending portion.

In an embodiment, the axially outer end face of the second backing ring is connected with a radially outer end face thereof through an arc portion.

In an embodiment, a liquid feeding hole passes through a side wall of the outer housing to communicate with the flow channel, and a plug is hermetically disposed in the liquid feeding hole.

In an embodiment, the main spring is mounted into the inner chamber of the outer housing through interference fitting. Before the interference fitting, an outer diameter of the main spring is larger than an inner diameter of the outer housing by 1 to 3 mm.

In an embodiment, a first relief space is formed between the first rubber peak and the third rubber peak along an axial direction.

In an embodiment, a second relief space is formed on an axially outer end face of the second rubber body.

Compared with the prior art, the present invention has the following advantages. The hydraulic bushing of the present invention is provided with the first rubber body, the liquid chambers, and the flow channel. The liquid chambers and the flow channel can not only enable smooth steering of the wheel during the curve running of the vehicle, thereby reducing the abrasion of the wheel and the rail, but also provide a relatively large stiffness for the vehicle during the straight running thereof, so as to maintain stable operation of the vehicle.

BRIEF DESCRIPTION OF THE DRAWINGS

The present invention will be explained in more detail with reference to embodiments and accompanying drawings, in which.

In the accompanying drawings, the same components are indicated by the same reference signs. The accompanying drawings are not drawn to an actual scale.

DETAILED DESCRIPTION OF THE EMBODIMENTS

The present invention will be further explained with reference to the attached drawings.

Figure 1:
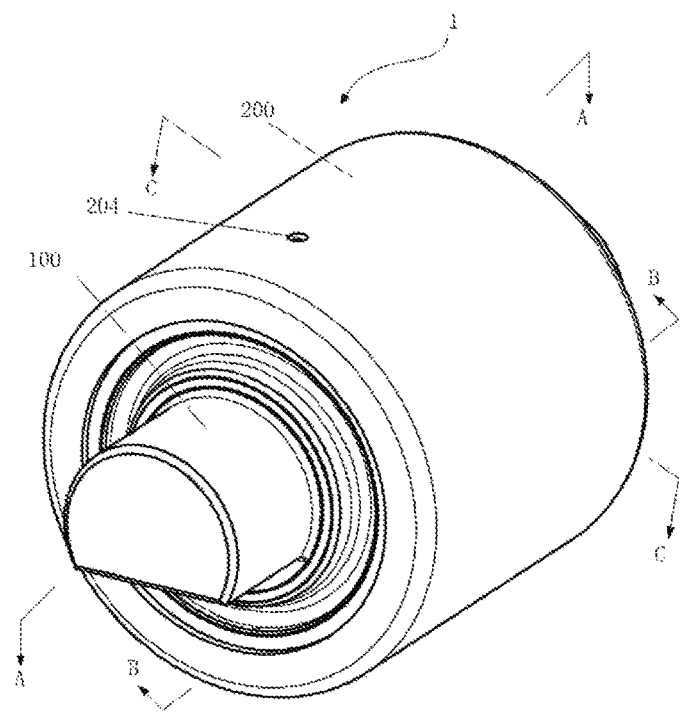
FIG. 1 schematically shows a perspective view of a hydraulic bushing according to one embodiment of the present invention.
Figure 2:
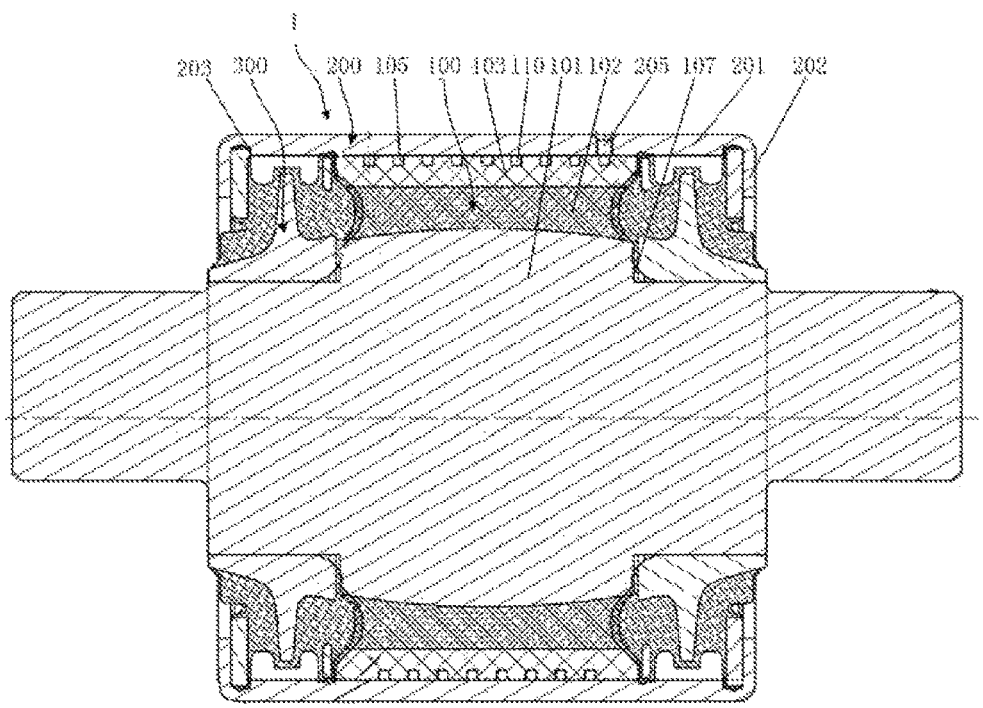
FIG. 2 is a cross-section view of FIG. 1 along line A-A.
Figure 3:
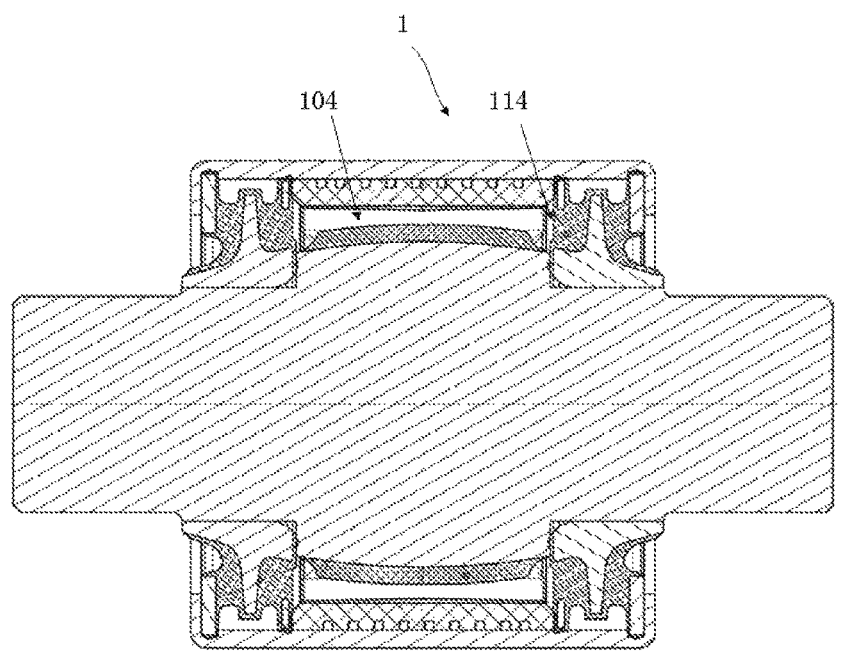
FIG. 3 is a cross-section view of FIG. 1 along line B-B.

As shown in FIG. 1, the hydraulic bushing 1 includes a main spring 100 and a cylindrical outer housing 200. As shown in FIGS. 2 and 3, the main spring 100 includes a core shaft 101, a first rubber body 102, and a sleeve 103. The first rubber body 102 is mounted on an outer wall of the core shaft 101. Two liquid chambers 104 are formed on the first rubber body 102, each being a through hole extending throughout the first rubber body 102 along an axial direction thereof. The two liquid chambers 104 are diametrically opposite to and spaced from each other along a radial direction of the first rubber body 102. The sleeve 103 is mounted on an outer wall of the first rubber body 102. In the meantime, a groove 110 is formed in the wall of the sleeve 103. The main spring 100 is disposed inside an inner chamber of the outer housing 200, so that a flow channel 105 is formed between the outer housing 200 and the sleeve 103 at the groove 110 for connecting two liquid chambers 104 with each other.

When the hydraulic bushing 1 is mounted on a rail vehicle, the core shaft 101 of the hydraulic bushing 1 is connected to a frame of a bogie of the rail vehicle, while the outer housing 200 is connected to a positioning arm of a wheel of the rail vehicle. In the meantime, the two liquid chambers 104 are located in tandem along a driving direction of the rail vehicle. That is, with reference to the driving direction of the rail vehicle, one of the two liquid chambers 104 is located before the other. When the rail vehicle is a curve running state, the wheel will steer and drive the positioning arm in movement, and then actuate the outer housing 200 to move relative to the core shaft 101, thus achieving the steering of the bogie connected with the core shaft 101 and the curving running of the rail vehicle. During this procedure, one of the two liquid chambers 104 will become smaller due to compression, while the other will become larger due to expansion. Liquid in the liquid chamber which becomes smaller due to compression will flow in the liquid chamber which becomes larger due to expansion through the flow channel 105, so as to comply with the relative movement between the core shaft 101 and the outer housing 200 and the steering. Therefore, during the curve running of the rail vehicle, the hydraulic bushing 1 according to the present invention can be more flexible than the conventional rubber arm in prior arts. In this way, the wheel can make a turn more smoothly, so that the abrasion of the wheel and the rail can be reduced. When the rail vehicle travels in a straight running state, the liquid chambers will suffer a relatively low pressing force, so that almost no liquid in the liquid chambers 104 and the flow channel 105 will flow. Therefore, rigidness of the hydraulic bushing 1 would not be varied largely compared with that of the conventional rubber arm in prior arts, thus maintaining a stable traveling state of the rail vehicle. In this way, the hydraulic bushing 1 has an excellent capability of rigidness adjustment, realizing a stable linear driving and a smooth steering for the rail vehicle.

In an embodiment, the core shaft 101 has a first step portion 107, so that it is formed as a stepped shaft with a diameter in the middle segment being larger than that at both end segments, as shown in FIG. 2. The first rubber body 102 is arranged on the middle segment of the core shaft 101. In a preferred embodiment, the middle segment of the core shaft 101 is configured to bulge outwardly, the bulging portion having an arc-shaped contour. That is, the middle segment of the core shaft is shaped as a drum. The first rubber body 102 is mounted on the middle segment of the core shaft 101. The inner side wall of the first rubber body 102 is connected with the core shaft 101 in a manner of conforming to the drum-like middle segment. The contour of the outer side wall of the first rubber body 102 presents a straight line in a transverse sectional view, so that the first rubber body 102 can be engaged with the sleeve 103. In this way, on the one hand, stress concentration at the region where the core shaft 101 contacts the first rubber body 102 can be avoided, thus enhancing the lifetime of the hydraulic bushing 1. On the other hand, amplitude of swing of the core shaft 101 relative to the outer housing 200 can be increased, thus enhancing the deflection of the core shaft 101 and finally enhancing the smooth steering capability of the rail vehicle.

Since the middle segment of the core shaft 101 is drum-shaped, and the first rubber body 102 located between the liquid chamber 104 and the core shaft 101 has a substantially uniform thickness except at the axial ends, the width of the liquid chamber 104 at the middle segment will be smaller than that at both end segments along the axial direction. With this arrangement, the problem that the liquid chambers 104 will be easily damaged at both ends thereof can be effective avoided, thus enhancing the lifetime of the hydraulic bushing 1. Moreover, with this arrangement, reaction sensitivity of liquid in the liquid chambers 104 can be increased, thus enhancing the smooth steering capability of the rail vehicle.

Figure 4:
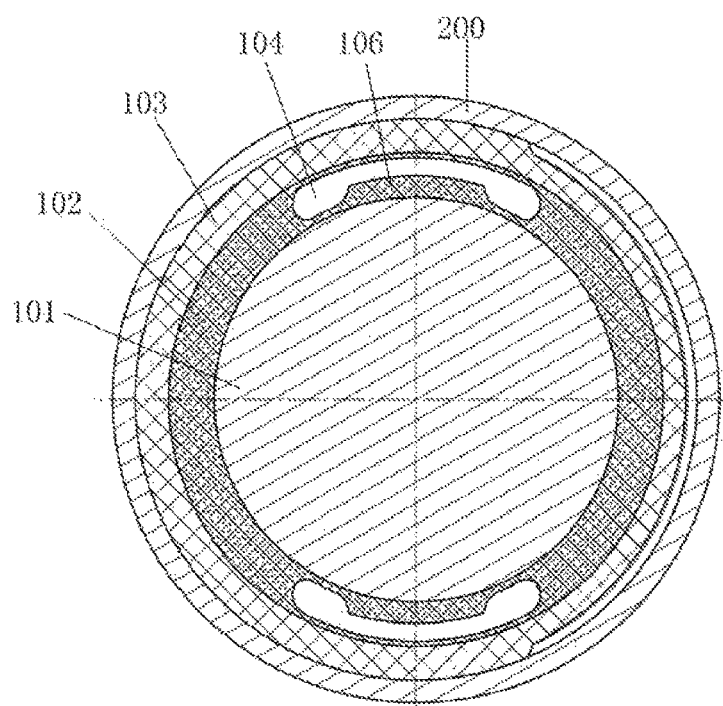
FIG. 4 is a cross-section view of FIG. 1 along line C-C.
Figure 6:
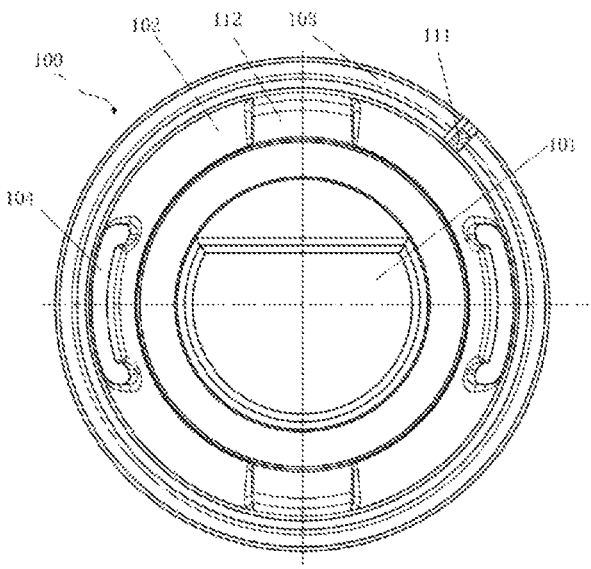
FIG. 6 is a left view of the main spring.

As shown in FIGS. 4 and 6, the liquid chambers 104 are distributed along a circumferential direction of the first rubber body 102. That is, in a radial sectional view, the liquid chambers 104 extend along an arc-like path. In addition, in the middle portion of each liquid chamber 104 there is provided with a limit projection 106, so that the radial dimension of each liquid chamber 104 is larger at both circumferential end portions than at the middle portion. Preferably, the limit projection 106 is arranged on the inner wall of each liquid chamber 104 near the core shaft 101. When the core shaft 101 moves relative to the outer housing 200, the limit projection 106 will probably contact the inner wall of the liquid chamber 104 near the sleeve 103 firstly, and thus play a role of limitation. In particular, when overloading, a top end of the limit projection 106 will abut against the inner wall of the liquid chamber 104 near the sleeve 103, so that the excessive deflection of the core shaft 101 relative to the outer housing 200 can be avoided, thus ensuring safety of use of the hydraulic bushing 1. In the meantime, the radial size of the liquid chamber 104 at each of its circumferential end portions is relatively large, thus forming a relatively large relief space. Therefore, the inner wall of the liquid chamber 104 near the core shaft 101 and that near the sleeve 103 will not be easily damaged, thus enhancing the lifetime of the hydraulic bushing 1.

Moreover, in the radial sectional view, all the segments of the liquid chamber 104 form a smoothly continuous curve. In particular, the liquid chamber 104 is configured as having an arc shape at its circumferential end portions. In this manner, stress concentration associated with the liquid chamber 104 can be effectively alleviated, thus further enhancing the lifetime of the hydraulic bushing 1.

Figure 5:
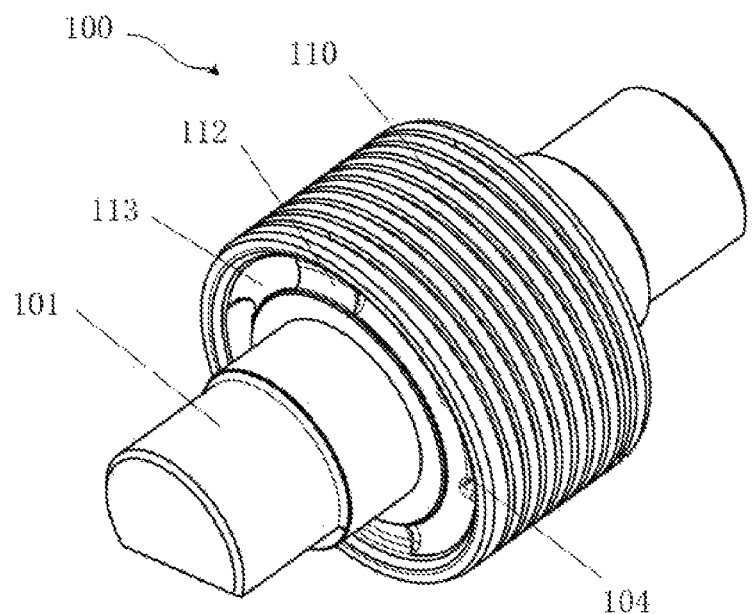
FIG. 5 is a perspective view of a main spring.

In one embodiment, the core shaft 101, the first rubber body 102 and the sleeve 103 are fixed together through vulcanization, to form the main spring 100, as shown in FIG. 5.

Figure 7:
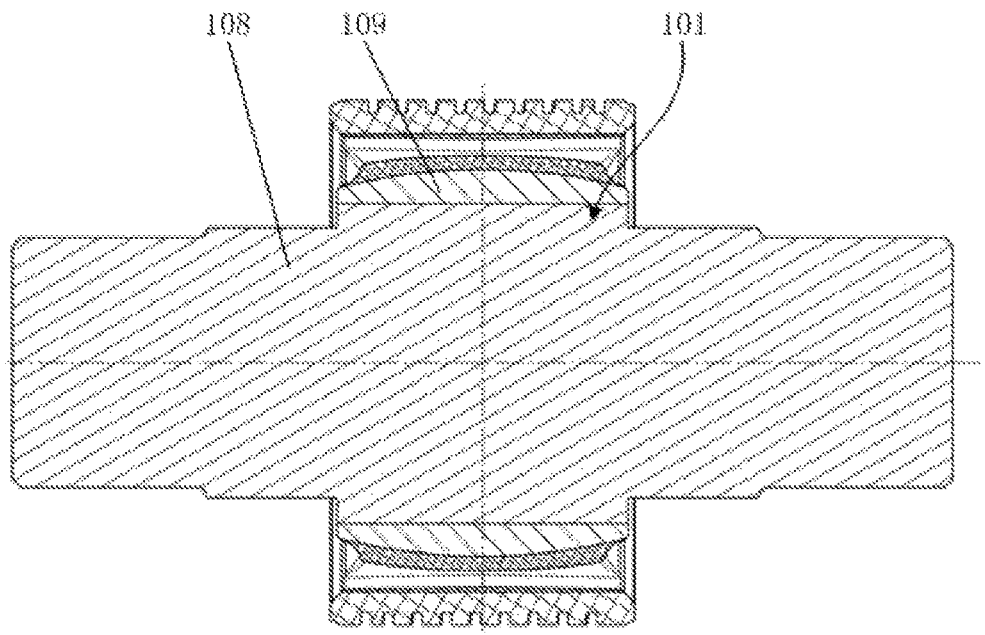
FIG. 7 is a cross-section view of another embodiment of the main spring.

According to another embodiment of the present invention, the core shaft 101 can be configured as a split-type structure. For example, as shown in FIG. 7, the core shaft 101 includes a first portion 108 configured as a stepped shaft, and a second portion 109 which is a sleeve-like member arranged on an outer wall of the first portion 108. In order to facilitate the production and simplify the structure, the outer wall surfaces of the first portion 108 and the second portion 109 each are shaped as a cylindrical surface. However, according to different requirements, the outer wall surface of the second portion 109 can be also shaped as an arcuate surface. In this way, during production of the hydraulic bushing 1, the first portion 108 and the second portion 109 can be manufactured separately, then the second portion 109, the first rubber body 102 and the sleeve 103 are put together to form an assembly, which is finally assembled with the first portion 108 to form the main spring 100. The core shaft 101 generally has a large size, e.g., has a diameter of 84 mm and a length of 226 mm, so that the production of the core shaft 101 is difficult and the cost thereof is high. However, according to the present embodiment, during the production of the main spring 100, only the second portion 109, which, for example, has a length of 70 mm, is necessary to be processed, instead of the entire core shaft 101. Thus the difficulties and the cost of the production are significantly reduced. In addition, during the vulcanization of the main spring 100, only the second portion 109, the first rubber body 102 and the sleeve 103 are necessary to be vulcanized because the core shaft 101 is of a split-type. Therefore, the heating time in vulcanization can be effectively reduced, thus saving the vulcanization cost. In the meantime, since the size of the portion of the core shaft 101 needed to be vulcanized is significantly reduced, the vulcanization effect can be greatly improved, thus enhancing the lifetime of the hydraulic bushing 1.

Figure 8:
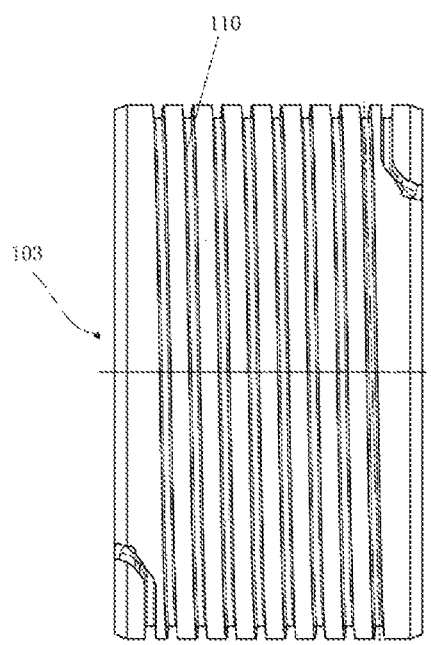
FIG. 8 is a front view of a sleeve.
Figure 9:
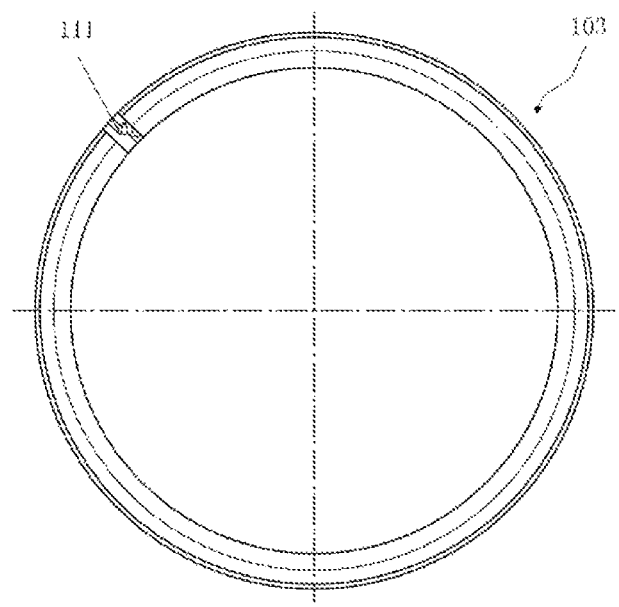
FIG. 9 is the right view of the sleeve.

A notch 111 communicating with the groove 110 is formed on an end face of the sleeve 103, as shown in FIG. 9. The notch 111 is in communication with the groove 110 at one end, and with the liquid chamber 104 at the other end. Preferably, the groove 110 is arranged on the outer wall of the sleeve 103 in a helical manner, as shown in FIG. 8. This arrangement can appropriately increase the length of the groove 110, so that it is convenient to adjust the length of the flow channel 105 to meet the related design requirements.

More preferably, the groove 110 is configured as having a rectangular cross section, the size of which can be selected according to actual requirements. This structure is simple and easy to realize. For example, the groove 110 can be configured as having a square cross section, the square having a length of side of 2 to 5 mm. It should be noted that the groove 110 can be configured as having a cross section of other shapes, such as V-shape, trapezoid shape, U-shape, semi-circular shape, or the like. The length of the groove 110 can be ranged from 2 to 5 m. For example, the flow channel 105 can be 3.4 m long. It should be noted that the groove 110 can have different lengths according to actual requirements. On the outer wall of the sleeve 103, the helix angle of the groove 110 may be 3 to 10 degrees.

Reference can be made to FIG. 2 again. A sealing assembly 300 is arranged at each end of the stepped core shaft 101, for ensuring the sealing of the flow channel 105, the liquid chamber 104, or the like.

Figure 11:
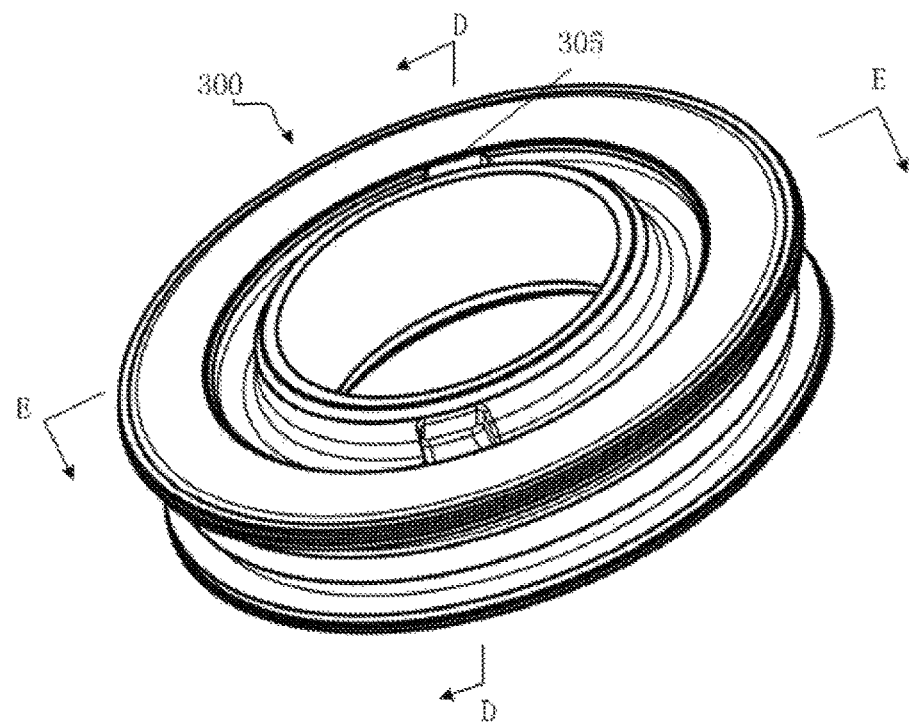
FIG. 11 shows a perspective view of a sealing assembly.
Figure 12:
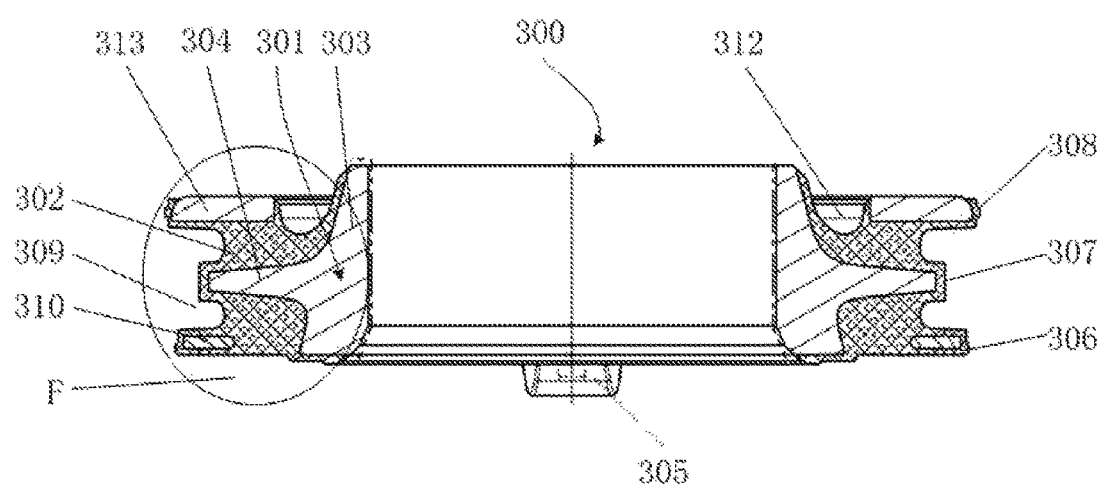
FIG. 12 is a cross-section view of FIG. 11 along line D-D.
Figure 13:
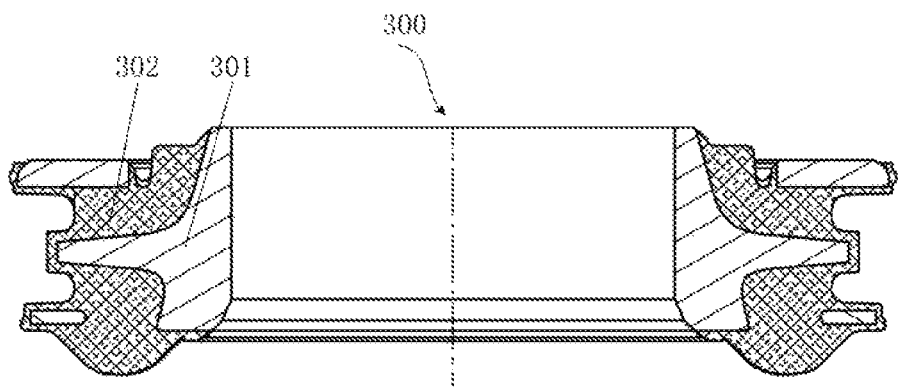
FIG. 13 is a cross-section view of FIG. 11 along line E-E.
Figure 14:
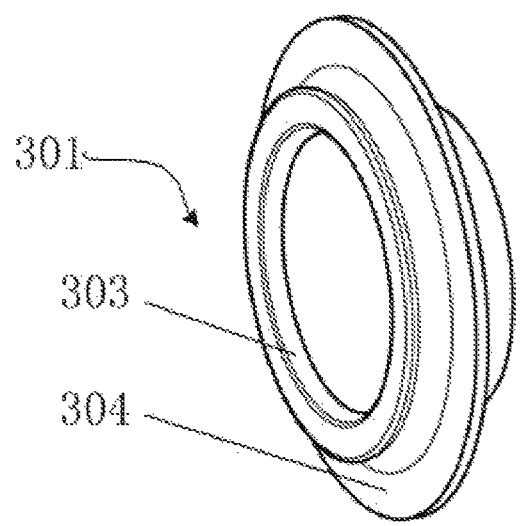
FIG. 14 shows a perspective view of a supporting ring assembly.

In an embodiment, as shown in FIGS. 11 to 13, the sealing assembly 300 includes a rigid supporting ring member 301, a second rubber body 302 and a first matching element 305. The supporting ring member 301 includes a mounting ring 303 and a projecting ring 304, as shown in FIG. 14. The mounting ring 303 has a generally cylindrical shape for mounting on the outer wall of the core shaft 101. The projecting ring 304 is located on the outer wall of the mounting ring 303 and extends outwardly. In the axial direction, the projecting ring 304 is located at an axially central position of the mounting ring 303. The second rubber body 302 is arranged on the outside of the mounting ring 303, and wrapped around the projecting ring 304. That is, the projecting ring 304 is inserted into the second rubber body 302. Specifically, the axial inner end face of the second rubber body 302 contacts the axial end face of the sleeve 103 and the first step face of 107 of the core shaft 101 both, thus axially sealing the flow channel 105 and the liquid chamber 104.

The first matching element 305 is provided on the second rubber body 302, and extends outwardly from the axial inner end face of the second rubber body 302 along the axial direction, so as to be in sealing contact with a second matching element 112 provided on the first rubber body 102 (see FIG. 2), thus avoiding the liquid chambers 104 in communication with each other at the same axial end face. Through the sealing assembly 300, not only the sealing for the flow channel 105 and the liquid chamber 104 in the hydraulic bushing 1 can be achieved, but the communication between the liquid chambers 104 at the same axial end face can be avoided. Therefore, it is ensured that liquid can flow from one of the liquid chambers 104 to the other only through the flow channel 105. Moreover, the sealing assembly 300 can improve the axial rigidity of the hydraulic bushing 1, realize rigidness adaptation of the hydraulic bushing 1 in multiple directions, so that the user's requirements can be met. Therefore, through adjustment of the sealing assembly 300, the ratio of the radial rigidity of the hydraulic bushing 1 to the axial rigidity thereof can be flexibly adjusted, so as to optimize the performance of the hydraulic bushing 1.

It should be noted that the foregoing merely describes the example in which the first matching element 305 extends outwardly. However, the first matching element 305 can also extend inwardly; in this case, the second matching element 112 should extend outwardly. In this manner, it can also prevent the two liquid chambers from communication with each other at the same axial end face of the first rubber body 102.

Figure 16:
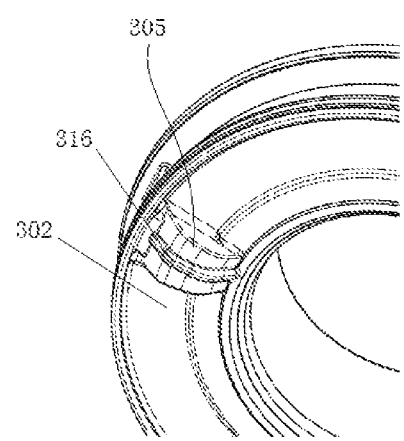
FIG. 16 shows a perspective view of a first matching body.

In a preferred embodiment, as shown in FIG. 16, the first matching element 305 is configured as a convex piece having an arcuate radial cross section. The arcuate surface of the first matching element 305 extends toward the second matching element 112. Accordingly, the second matching element 112 is configured as a concave piece having an arcuate radial cross section. More preferably, a projecting strip 316 is provided on the arcuate surface of the first matching element 305. The projecting strip 316 extends corresponding to the arcuate surface of the first matching element 305 along the radial direction. The projecting strip 316 can provide a better sealing effect. In addition, the first matching element 305 and the second matching element 112 closely fit with each other, so that the leakage of liquid can be effectively prevented and the stress concentration can be alleviated.

Along the axial direction from inner to outer, the second rubber body 302 is provided with at least one rubber peak, through which the second rubber body 302 can form an interference fit with the outer housing 200, thus ensuring the axial sealing. In a particular embodiment, the second rubber body 302 is provided with two peaks, i.e., a first rubber peak 306 and a third rubber peak 308. The first rubber peak 306 forms an interference fit with the outer housing 200, so that the flow channel 105 can be well sealed, and no liquid can be leaked from a gap formed between the second rubber body 302 and the outer housing 200. Moreover, the third rubber peak 308 also forms an interference fit with the outer housing 200, thus further ensuring and improving the sealing effect on the flow channel 105.

The third rubber peak 308 is located outside of the first rubber peak 306 with reference to the axial direction. In addition, when not being mounted into the outer housing 200, the third rubber peak 308 has a diameter larger than the first rubber peak 306. Preferably, the diameter of the third rubber peak 308 is larger than that of the first rubber peak 306 by 6 to 10 mm. During assembly, the sealing assembly 300 can be put into the outer housing 200 through press fit. The above structure can ensure a smooth assembly, provide two sealing positions, and sufficiently ensure the sealing effect.

The first rubber peak 306 is spaced from the third rubber peak 308, and thus a first relief space 309 is formed therebetween. When the rail vehicle is in the curve running state, the outer housing 200 will move relative to the core shaft 101, and thus the second rubber body 302 will be compressed. With the first relief space 309, the resistance to the movement of the outer housing 200 will be reduced, so that the outer housing 200 can easily move relative to the core shaft 101 to some extent, thus enhancing the smooth steering capability of the rail vehicle.

A second rubber peak 307 is provided between the first rubber peak 306 and the third rubber peak 308, at a position where the projecting ring 304 is formed. In addition, the second rubber peak 307 extends into the first relief space 309, to a position spaced from the outer housing 200 at its natural state. That is, the second rubber peak 307 does not directly contact the outer housing 200. Preferably, the second rubber peak 307 is spaced from the outer housing 200 by a distance ranged from 3 to 10 mm, such as 5 mm. When a relatively significant movement of the outer housing 200 relative to the core shaft 101 is generated, the second rubber peak 307 will abut against the outer housing 200 for preventing the movement from being increased remarkably. Therefore, the first relief space 309 provides a certain room for the relative movement of the outer housing 200 relative to the core shaft 101, and at the same time, the rigid projecting ring 304 located at the second rubber peak 307 can also prevent a remarkable movement. Moreover, the above arrangement can also enhance the rigidity of the sealing assembly 300, thus optimizing the axial rigidity of the hydraulic bushing 1.

Figure 15:
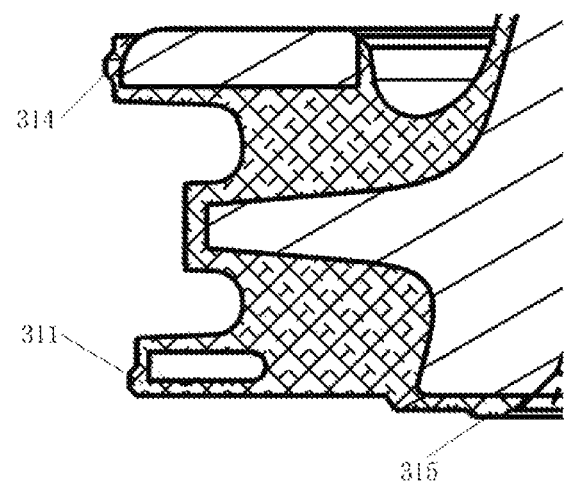
FIG. 15 is an enlarged view of area F of FIG. 12.

Within the first rubber peak 306 is buried a first backing ring 310, which is a rigid ring and arranged coaxially with the mounting ring 303. In addition, the first backing ring 310 is adjacent to the sleeve 103 and faces toward the end face of the sleeve 103 in the axial direction, and to the outer housing 200 in the radial direction. Through the first backing ring 310, it is ensured that the second rubber body 302 can contact the sleeve 103 in the radial direction, thus further enhancing the sealing performance of the sealing assembly 300. Preferably, a first protrusion 311 projecting outwardly is provided at a position of the first rubber peak 306 corresponding to the first backing ring 310, as shown in FIG. 15. The first protrusion 311 can further strengthen the sealing performance of the sealing assembly 300, ensuring an excellent sealing effect.

Figure 10:
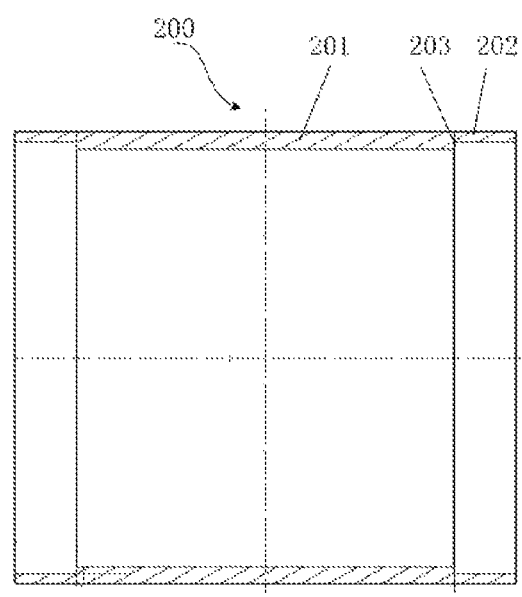
FIG. 10 is a cross-sectional view of an outer housing before flanging.

The outer housing 200 includes a housing body 201 and two extending portions 202, as shown in FIG. 2. The housing body 201 is a cylindrical member and arranged on the outer wall of the sleeve 103. The extending portions 202 are respectively arranged at and secured to both axial ends of the housing body 201. Each extending portion 202 is shaped as a circular ring extending inwardly along the axial direction. The housing body 201 and the extending portions 202 are formed into one piece, as shown in FIG. 10, which contacts the sealing assembly 300 through pressing fit. The extending portions 202 define the axial positions of the first rubber body 102, the sleeve 103 and the sealing assembly 300, ensuring the close abutment between the sealing assembly 300 and the sleeve 103. Therefore, the sealing effect is guaranteed. In addition, the inner wall of each extending portion 202 is distant from the supporting ring member 301, say, by 5 mm to 10 mm, along the radial direction. When the outer housing 200 moves relative to the core shaft 101, the distance between the extending portion 202 and the supporting ring member 301 can prevent the rigid extending portion 202 from touching the rigid supporting ring member 301, thus ensuring the smooth steering capability of the rail vehicle.

As shown in FIG. 10, during production, a second step surface 203 is provided on the outer housing 200, so that the inner diameter of the outer housing 200 at each end part thereof is larger than that of the outer housing 200 in the middle part. That is, the outer housing 200 has a wall thickness at its middle part larger than that at both end parts. The extending portions 202 are formed at both end parts through extrusion, which may be easily carried out under the structure. In addition, the third rubber peak 308 contacts not only the inner wall of the outer housing 200, but also the second step surface 203, thus enhancing the sealing effect. Moreover, a second backing ring 313, which is a rigid ring arranged coaxially with the mounting ring 303, is inserted into the third rubber peak 308. The second backing ring 313 is positioned between the second step surface 203 and the extending portion 202 in the axial direction, and adjacent to the outer housing 200 in the radial direction. Moreover, the axially outer end face of the second step surface 203 directly abuts with the extending portion 202, by means of which the sealing performance of the sealing assembly can be further enhanced.

As seen from FIG. 15, the axially outer end face of the second step surface 203 is connected with the radially outer end face thereof through an arc surface. Therefore, it is convenient for press-fit of the outer housing 200, and the desirable press-fit for the extending portions 202 can be ensured.

As shown in FIG. 15, a second protrusion 314 projecting outwardly is provided on the third rubber peak 308, and located between the second backing ring 313 and the outer housing 200. Thus the sealing performance of the sealing assembly 300 can be further enhanced.

Further as shown in FIG. 15, a third protrusion 315 is provided on the axial end face of the second rubber body 302, and located between the second rubber body 302 and the step surface 107 of the core shaft 101. Thus the sealing of an auxiliary liquid chamber 114 can be further enhanced.

Moreover, as shown in FIG. 12, a second relief space 312 is provided on the second rubber body 302. The second relief space 312, configured as an annular recess, is located at the axially outer end face of the second rubber body 302. With this second relief space 312, the radial deformation capability of the sealing assembly 300 can be enhanced, thus improving the smooth steering capability of the rail vehicle.

As shown in FIG. 1, a liquid feeding hole 204 is provided in the outer housing 200. The liquid feeding hole 204 is configured as a through hole, which passes through the wall of the outer housing 200 to communicate with the flow channel. The liquid feeding hole 204 is simple in structure and easy to manufacture, and also facilitates the operation of feeding liquid. Moreover, a plug 205 is hermetically disposed in the liquid feeding hole 204, as shown in FIG. 2. The plug 205 can be connected with the liquid feeding hole 204 e.g. through hermetical threads.

The end face of the first rubber body 102 is formed with an annular groove 113, as shown in FIG. 5. At the annular groove 113, an auxiliary liquid chamber 114 is formed by the first rubber body 102, the second rubber body 302, the sleeve 103 and the first matching element 305, as shown in FIG. 3. The auxiliary liquid chamber 114 is located between the liquid chamber 104 and the flow channel 105, and communicates with the latter two. On the one hand, the auxiliary liquid chamber 114 can enhance the liquid storing capability of the hydraulic bushing 1, thus improving effect of rigidness adjustment of the hydraulic bushing 1. On the other hand, the auxiliary liquid chamber 114 can enhance use safety of the hydraulic bushing 1. For example, even if the liquid chamber 104 is blocked, liquid in the liquid chamber 104 can still flow.

The main spring 100 is arranged inside the outer housing 200 through press fit, by mean of which the flow channel 105 can be well sealed. According to the present invention, before the press fit, the outer diameter of the main spring 100 is larger than the inner diameter of the outer housing 200 by 1.5 to 2.3 mm. For example, the inner diameter of the outer housing 200 can be in a range of 124.3 to 124.5 mm, while the outer diameter of the main spring 100 can be in a range of 126.3 to 126.6 mm. With these dimensions, it is ensured that the main spring 100 can be smoothly pressed into the outer housing 200, and at the same time the seal between the main spring 100 and the outer housing 200 can be also guaranteed.

In a preferred embodiment, the sleeve 103 is made of nylon 66. Since nylon 66 is excellent in rigidness, fatigue resistance, thermal resistance and abrasion resistance, the lifetime of the hydraulic bushing 1 can be enhanced.

It should be noted that, the singular forms "a(n)", "one", and "the" as used here in the description, abstract, and claims of the present invention, are intended to include the plural forms as well, unless the context clearly indicates otherwise.

Although the present invention has been described with reference to preferred embodiments, various modifications and variants to the present invention may be made by anyone skilled in the art, without departing from the scope and spirit of the present invention. In particular, as long as there is no structural conflict, the respective technical features mentioned in various embodiments may be combined with one another in any manner. The present invention is not limited to the specific embodiments disclosed herein, but rather includes all the technical solutions falling within the scope of the claims.

The invention claimed is:

1. A hydraulic bushing, including a main spring and a cylindrical outer housing, the main spring comprising:
   a core shaft;
   a first rubber body arranged on an outer wall of the core shaft, wherein two liquid chambers diametrically opposite to and spaced from each other are formed on the first rubber body, the two liquid chambers each extending throughout the first rubber body along an axial direction thereof; and
   a sleeve mounted on an outer wall of the first rubber body, a groove being formed in a wall of the sleeve,
   wherein the main spring is disposed inside an inner chamber of the outer housing, and a flow channel for connecting the two liquid chambers with each other is formed between the outer housing and the sleeve through the groove,
   wherein the groove is arranged helically in the outer wall of the sleeve, and two notches in communication with the groove are provided on opposite axial end faces of the sleeve,
   wherein the core shaft has two first step surfaces, so that the core shaft is formed as a stepped shaft with a diameter in its middle segment larger than that at both end segments thereof, the first rubber body being arranged on the middle segment of the core shaft,
   wherein two sealing assemblies, each including a second rubber body and a first matching element, are provided at opposite ends of the core shaft, respectively, each second rubber body being configured to contact the respective axial end face of the sleeve and the first step surface, and the first matching elements each being configured to separate the two liquid chambers from each other at a respective end, wherein each of the two sealing assemblies include a rigid supporting ring member, which includes a mounting ring arranged on the core shaft and a projecting ring extending outwardly along a radial direction from an outer wall of the mounting ring, and wherein the second rubber body of each of the two sealing assemblies is arranged on an outside of the respective mounting ring, and wrapped around the respective projecting ring.

2. The hydraulic bushing according to claim 1, wherein the liquid chambers are configured to extend along the circumferential direction of the first rubber body in a radial cross section, and a radial dimension of the liquid chambers at both circumferential end portions thereof are larger than that at their middle portions.

3. The hydraulic bushing according to claim 1, wherein a liquid feeding hole passes through a side wall of the outer housing to communicate with the flow channel, and a plug is hermetically disposed in the liquid feeding hole to hermetically seal the feeding hole.

4. The hydraulic bushing according to claim 1, wherein the main spring is mounted into the inner chamber of the outer housing through interference fitting, and wherein before the interference fitting, an outer diameter of the main spring is larger than an inner diameter of the outer housing by 1 to 3 mm.

5. The hydraulic bushing according to claim 1, wherein the first matching element of each of the two sealing assemblies, configured as a convex piece, is arranged on a respective axial inner end face of the second rubber body of each of the two sealing assemblies, and engaged with a respective second matching element, the respective second matching element is formed on the first rubber body and configured as a concave piece.

6. The hydraulic bushing according to claim 5, wherein the first matching element of each of the two sealing assemblies is configured as a convex piece having an arcuate radial cross section, and the arcuate surface of the first matching element each extends toward the respective second matching element, or the first matching element of each of the two sealing assemblies is configured as a convex piece having an arcuate radial cross section, and an arcuate surface of the first matching element extends toward the respective second matching element, a projecting strip being provided on the arcuate surface of the first matching element and extending along the respective arcuate surface.

7. The hydraulic bushing according to claim 5, wherein an end face of the first rubber body of each of the two sealing assemblies is formed with an annular groove distributed along a circumferential direction thereof, and at least one auxiliary liquid chamber is enclosed by the annular groove of the first rubber body, the respective second rubber body, the sleeve and the respective first matching element.

8. The hydraulic bushing according to claim 1, wherein the second rubber body of each of the two sealing assemblies is provided with at least one rubber peak engaged with the outer housing through interference fit.

9. The hydraulic bushing according to claim 8, wherein the at least one rubber peak comprises a first rubber peak, a second rubber peak and a third rubber peak, each of the first rubber peak, the second rubber peak and the third rubber peak being provided along a direction from axially inner to axially outer, both of the first rubber peak and the third rubber peak engage with the outer housing through interference fit, and the second rubber peak is formed around the respective projecting ring, and a first backing ring, which is rigid and coaxial with the mounting ring of the rigid supporting ring member of each of the two sealing assemblies, is buried in the first rubber peak at a position near the sleeve, and faces toward the end face of the sleeve.

10. The hydraulic bushing according to claim 9, wherein a first protrusion bulging outwardly along a radial direction is provided on the first rubber peak at a position corresponding to the respective first backing ring.

11. The hydraulic bushing according to claim 9, wherein a first relief space is formed between the first rubber peak and the respective third rubber peak along an axial direction.

12. The hydraulic bushing according to claim 9, wherein the second rubber body of each of the two sealing assemblies includes a relief space formed on the axially outer end face of the respective second rubber body.

13. The hydraulic bushing according to claim 9, wherein the sleeve includes a cylindrical housing body and a radially-extending portion connected thereto, the radially-extending portion being formed by press fit for contacting the two sealing-assemblies.

14. The hydraulic bushing according to claim 13, wherein a second step surface is provided on the housing body, so that an inner diameter of the housing body at each end part thereof is larger than that of the housing body in its middle part, and a second backing ring, which is rigid and coaxial with the respective mounting ring, is buried in the third rubber peak, and extends, along with the third rubber peak located radially outside of the second backing ring, into a space formed by the second step surface and the radially-extending portion.

15. The hydraulic bushing according to claim 14, wherein a second protrusion bulging outwardly along the radial direction is provided on the third rubber peak at a position corresponding to the respective second backing ring.

16. The hydraulic bushing according to claim 14, wherein an axially outer end face of the second backing ring directly contacts with the respective radially-extending portion.

17. The hydraulic bushing according to claim 14, wherein the axially outer end face of the second backing ring is connected with a radially outer end face thereof through an arc portion.

* * * * *